United States Patent
Clarys et al.

[11] Patent Number: 5,823,067
[45] Date of Patent: *Oct. 20, 1998

[54] CRANK HANDLE APPARATUS AND METHOD

[75] Inventors: Bernard James Clarys; Charles Milton Schmeichel, both of Jamestown, N. Dak.

[73] Assignee: Agri-Cover, Inc., Jamestown, N. Dak.

[*] Notice: The term of this patent shall not extend beyond the expiration date of Pat. No. 5,482,347.

[21] Appl. No.: 596,703

[22] Filed: Feb. 5, 1996

Related U.S. Application Data

[63] Continuation of Ser. No. 204,523, Mar. 1, 1994, abandoned.

[51] Int. Cl.⁶ .................................. B60P 7/04; B25G 1/04
[52] U.S. Cl. .................................. 74/546; 74/547; 296/98
[58] Field of Search .......................... 74/545, 546, 547; 16/115; 296/98, 100; 160/309

[56] References Cited

U.S. PATENT DOCUMENTS

| | | |
|---|---|---|
| Re. 31,746 | 11/1984 | Dimmer et al. . |
| 102,642 | 5/1870 | Yenne . |
| 989,069 | 4/1911 | Siewert . |
| 1,558,114 | 10/1925 | Morrison . |
| 1,612,446 | 12/1926 | Larson .................................. 74/547 |
| 1,643,281 | 9/1927 | Baumann et al. .................. 160/309 X |
| 1,941,214 | 12/1933 | Kusterle .................................. 74/547 |
| 2,595,597 | 5/1952 | Morseth . |
| 2,906,323 | 9/1959 | Macy . |
| 2,976,082 | 3/1961 | Dahlman . |
| 3,384,413 | 5/1968 | Sargent . |
| 3,515,428 | 6/1970 | Killion . |
| 3,549,198 | 12/1970 | Cappello . |
| 3,785,694 | 1/1974 | Sargent . |
| 3,854,770 | 12/1974 | Grise et al. . |
| 3,975,047 | 8/1976 | McClellan . |
| 4,030,780 | 6/1977 | Petretti . |
| 4,050,734 | 9/1977 | Richard . |
| 4,082,347 | 4/1978 | Petretti . |
| 4,095,840 | 6/1978 | Woodard . |
| 4,157,202 | 6/1979 | Bachand . |
| 4,341,416 | 7/1982 | Richard . |
| 4,380,350 | 4/1983 | Block . |
| 4,484,777 | 11/1984 | Michel . |
| 4,505,512 | 3/1985 | Schmeichel et al. . |
| 4,516,802 | 5/1985 | Compton . |
| 4,544,196 | 10/1985 | Schmeichel et al. . |
| 4,659,134 | 4/1987 | Johnson . |
| 4,691,957 | 9/1987 | Ellingson . |
| 4,703,971 | 11/1987 | Schmeichel et al. . |
| 4,715,089 | 12/1987 | Schema ..................................... 16/115 |
| 4,834,445 | 5/1989 | Odegaard . |
| 4,874,196 | 10/1989 | Goldstein et al. . |
| 4,893,864 | 1/1990 | Bailey . |
| 4,915,439 | 4/1990 | Cramaro . |
| 5,002,328 | 3/1991 | Michel . |
| 5,076,338 | 12/1991 | Schmeichel et al. . |
| 5,174,353 | 12/1992 | Schmeichel et al. . |
| 5,179,991 | 1/1993 | Haddad, Jr. . |
| 5,180,203 | 1/1993 | Goudy . |
| 5,211,440 | 5/1993 | Cramaro ..................................... 296/98 |
| 5,240,303 | 8/1993 | Hageman . |

FOREIGN PATENT DOCUMENTS

| | | | |
|---|---|---|---|
| 112325 | 2/1929 | Austria ..................................... 74/547 |

OTHER PUBLICATIONS

*Shur–Lok Rollup Tarp*, Wahpeton Canvas Co., SD, Feb., 1993 (3 pages).

*Primary Examiner*—Richard M. Lorence
*Attorney, Agent, or Firm*—Moore & Hansen

[57] ABSTRACT

A crank handle (40) which is used in a roll-up flexible cover assembly (64) for an open container, such as a truck (68), includes a longitudinal tube (42) and a rotatable tube (44). The rotatable tube (44) has a longitudinal portion (46) being telescopically disposed in the longitudinal tube (42). The rotatable tube (44) is adjustable among a stored location, an adjusting position, and a working location. The crank handle (40) is extended at the working location, so that the operator can stand away from the side of the truck (68) and easily operate the crank handle (40). The crank handle (40) is retracted to the stored location, preferably on the side of the truck (68). The rotatable tube (44) of the crank handle (40) is turned to a desired direction at the adjusting position so that the crank handle (40) can be vertically stored in a desire location.

14 Claims, 7 Drawing Sheets

CRANK HANDLE APPARATUS AND METHOD

This is a File Wrapper Continuation application of application Ser. No. 08/204,523, filed Mar. 1, 1994 now abandoned.

FIELD OF THE INVENTION

The present invention relates to a crank handle used in a roll-up tarp assembly for an open container, such as a truck, a trailer, etc. More particularly, the present invention relates to an adjustable crank handle.

BACKGROUND OF THE INVENTION

Tarp assemblies are used to cover open containers, such as an open truck box or trailer, in transporting sand, dirt, gravel, and wood chips, etc., to prevent them from falling onto the road or vehicles. Tarp assemblies are also used to protect loads that are susceptible to damage from wind, snow, rain, fumes, etc.

Operators open and close a tarp to cover and uncover the open containers either by hand cranking or motorized mechanisms. Although the motorized tarp assemblies are easy to operate, the hand cranking tarp assemblies are simpler and cheaper so that they are still very popular in transportation industry.

The hand cranking tarp assembly usually includes a crank handle. The crank handle is attached to a roll tube or rod for rolling on and off the tarp so as to open and close the open container, such as the open truck box. Since it is easier to operate the crank handle when the operator stands away from the truck, the current crank handle is often made long enough for the operator to reach and operate it.

When the truck or other vehicle is moving at an especially high speed, the crank handle may create safety problems. Thus, traditionally, the crank handle is stored on the side or back of the truck. However, the long crank handle causes storage problems because it is too long. In order not to hit the ground or not to be disposed at the lower extremities of the truck, the crank handle is usually cross-stored on the side or back of the truck. The cross-storage of the crank handle on the side or back of the truck may create a lot of tension on the roll tube or the connection between the roll tube and the crank handle because the cross-stored crank handle has to be turned at a certain angle. Further, the cross-storage of the crank handle on the back of the truck causes interference with activities of the tailgate or door on the back of the truck. U.S. Pat. No. 4,691,957 discloses such a cross-stored crank handle on the back of the truck. U.S. Pat. No. 4,302,043 and the reissue patent Re. 31,746 disclose a similar cross-stored crank handle on the back of the truck. U.S. Pat. Nos. 4,484,777, 4,505,512, and 5,180,203 are other examples.

U.S. Pat. No. 4,516,802 discloses a crank handle which is cross-stored on the side of the truck.

The present invention overcomes the above discussed disadvantages associated with the crank handle used in the tarp assemblies.

SUMMARY OF THE INVENTION

The present invention relates to a crank handle used in a roll-up tarp assembly for an open container, such as a truck, a trailer, etc. More particularly, the present invention relates to an adjustable crank handle.

In one embodiment in accordance with the principles of the present invention, a crank handle includes a rotatable tube being telescopically disposed in a longitudinal tube. The crank handle can thus be extended or retracted to a certain length so that the crank handle can be retracted and vertically stored on the side or back of the containers. In addition, the operator can extend the crank handle and stand away from the container so as to easily operate the crank handle. The longitudinal tube is configured and arranged for rotation with the rotatable tube when the rotatable tube is locked in the longitudinal tube.

Still in one embodiment, the crank handle includes an adjusting means for adjusting the angular position of the rotatable tube relative to the longitudinal tube and a locking means for locking the rotatable tube relative to the longitudinal tube so that two tubes rotate together. The tubes are rotatably locked in the longitudinal tube when the operator rotates the handle portion at a working position, so that at the working position, the longitudinal tube is rotated with the rotatable tube. The adjusting means allows the operator to rotatably disengage the rotatable tube and the longitudinal tube so that the rotatable tube can be freely rotated in the longitudinal tube when in an adjusting position. Therefore, the crank handle can be stored at a desired position in a desired direction without inputting tension force on a roll tube or a connecting device to which the crank handle is connected.

Yet in one embodiment, the adjusting means includes an enlarged portion at the distal end of the rotatable tube opposite the handle portion end, and an enlarged end portion at the distal end of the longitudinal tube opposite the handle portion end of the rotatable tube. When the enlarged portion of the rotatable tube is axially slid into the enlarged end portion of the longitudinal tube, the enlarged portion of the rotatable tube is freely rotated within the enlarged end portion of the longitudinal tube.

Further in one embodiment, the locking means includes a multi-sided body portion of the longitudinal tube and a multi-sided enlarged portion of the rotatable tube. When the multi-sided enlarged portion of the rotatable tube is disposed within the multi-sided body portion of the longitudinal tube, the rotatable tube is locked relative to the longitudinal tube. Accordingly, the rotatable tube is rotated with the longitudinal tube.

Still in one embodiment, the longitudinal tube also includes a reduced diameter end portion which is on the opposite end of the enlarged end portion. The reduced diameter end portion has a smaller diameter than the enlarged portion of the rotatable tube, so that the rotatable tube extends to the longest length without falling out of the longitudinal tube. Thus, the operator is able to stand away from the containers.

Yet in one embodiment, the enlarged and reduced diameter end portions of the longitudinal tube have a circular cross-section. The body portion of the longitudinal tube has a rectangular cross-section. The enlarged portion of the rotatable tube has a similar but smaller rectangular cross-section. This allows for quarter turns or 90° angular adjustments of the rotatable tube relative to the longitudinal tube. The rest portion of the rotatable tube has a circular cross-section.

In one embodiment, the crank handle is used in tarp assemblies wherein the crank handle is connected to a roll tube through a connecting device. The crank handle is operated among working, storing, and adjusting positions.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters generally indicate corresponding parts throughout the several views.

DETAILED DESCRIPTION OF THE PREFERRED EMBODIMENT

Figure 1:
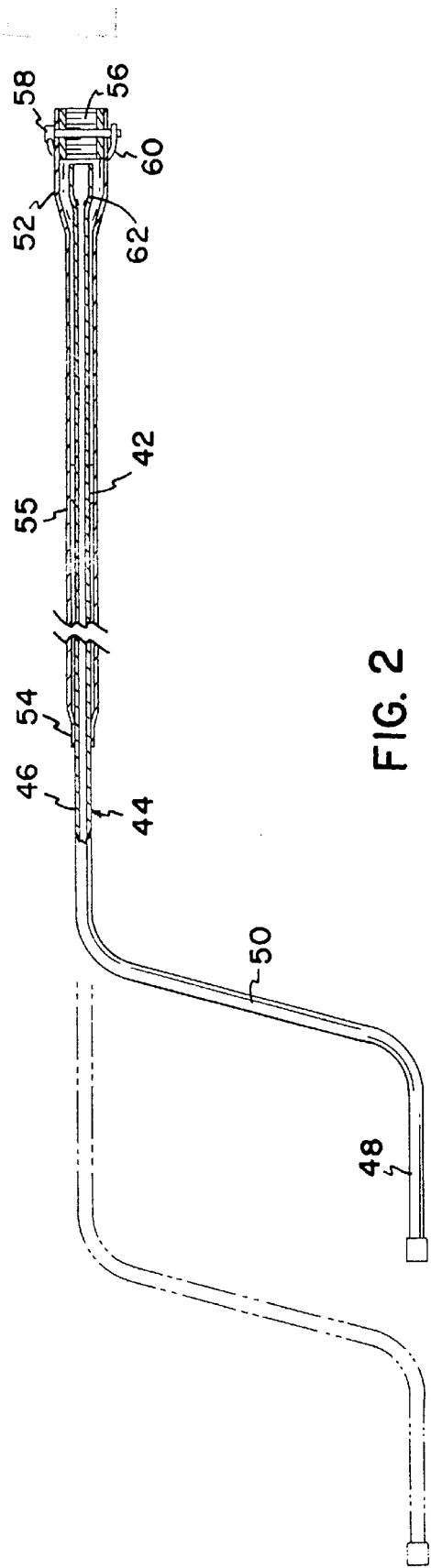
FIG. 1 is a plane view of an embodiment of a crank handle in accordance with the principles of the present invention having a shortened longitudinal tube for the purposes of illustration (it is also shortened in the following drawings).

In FIG. 1, a crank handle which is designated as reference numeral 40 is shown. The crank handle 40 includes a longitudinal tube 42 and a rotatable tube 44.

The rotatable tube 44 has a longitudinal portion 46 partially, telescopically, disposed in the longitudinal tube 42. A handle portion 48 which is substantially parallel to a longitudinal axis of the longitudinal tube 42 rotates the rotatable tube 44 about the longitudinal axis. A middle portion 50 is disposed between the handle portion 48 and the longitudinal portion 46.

The longitudinal tube 42 has an enlarged end portion 52 and a reduced diameter end portion 54. The enlarged and reduced diameter end portions 52,54 have a circular cross-section. A body portion 55 of the longitudinal tube 42 has a rectangular cross-section. It is appreciated that any other shapes, such as square, triangle, can be designed and arranged as well. The enlarged end portion 52 is connected to a roll tube 70 of a roll-up flexible cover assembly 64 (see FIGS. 6–8) through a connecting device 72. The connecting device 72 as shown is a flexible hose which transfers rotating momentum from the crank handle 40 to the roll tube 70 so that when the crank handle 40 is rotated, the roll tube 70 is rotated accordingly. It is appreciated that any other types of connecting device, such as U-joint, can be configured.

Figure 2:
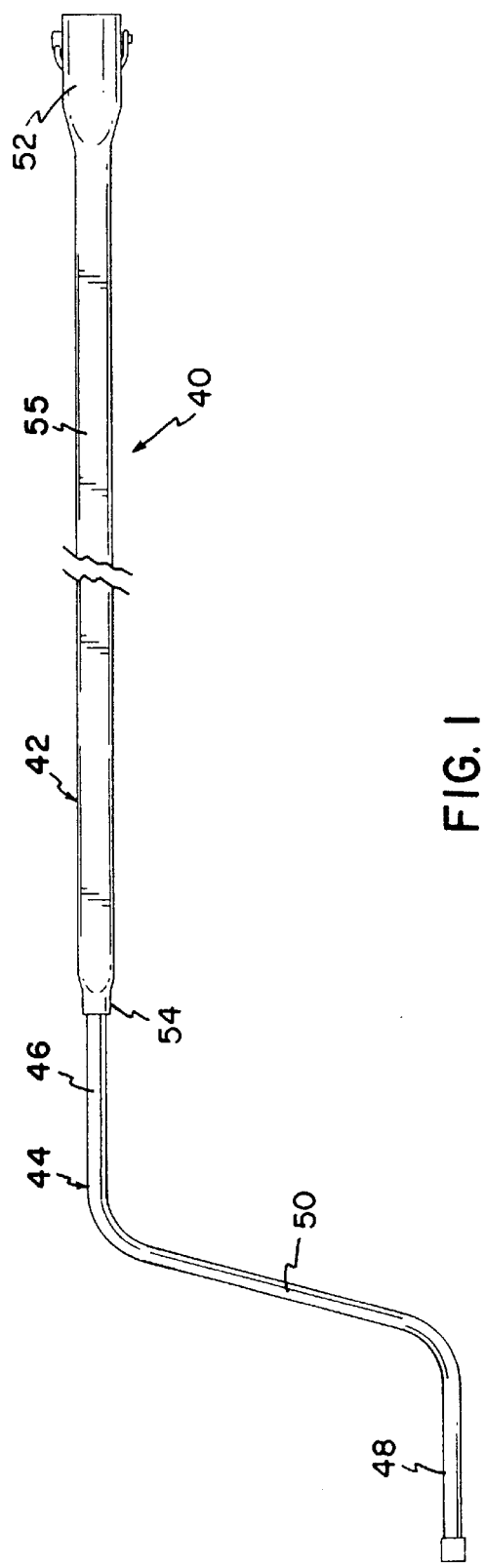
FIG. 2 is a cross-sectional view of the crank handle in an adjusting position (solid lines) and at a working or storing position (phantom lines).

As shown in FIG. 2, a fitting 56, a mounting pin 58, and a mounting spring 60 are disposed proximate at the enlarged end portion 52. The fitting 56, the mounting pin 58, and the mounting spring 60 are used to prevent the rotatable tube 44 from falling out of the enlarged end portion 52 of the longitudinal tube 42, and to connect the roll tube 70 and connecting device 72 as well.

FIG. 2 also shows that the rotatable tube 44 has an enlarged portion 62. The enlarged portion 62 is axially reciprocated inside the longitudinal tube between the enlarged end portion 52 and the reduced diameter end portion 54. The enlarged portion 62 has a rectangular cross-section which is similar but smaller than that of the body portion 55 of the longitudinal tube 42. Accordingly, when the enlarged portion 62 is disposed in any position between two end portions 52,54, the rotatable tube 44 is rotatably locked in the longitudinal tube 42. Thus, the rotatable tube 44 and the longitudinal tube 42 rotate together. In addition, the rest portion of the rotatable tube 44 has a circular cross-section. Thus, when the enlarged portion 62 is disposed in the enlarged end portion 52, there is no rotatable restriction between the longitudinal tube 42 and the rotatable tube 44 such that the rotatable tube 44 can be freely adjusted to any position with respect to the longitudinal tube. When the enlarged portion 62 is moved toward the reduced diameter end portion 54, since the diameter of the reduced diameter end portion 54 is smaller than the length of one side of the rectangular cross-section of the enlarged portion 62, the reduced diameter end portion 54 stops the further movement of the enlarged portion 62. Thus, it prevents the rotatable tube 44 from falling out of the longitudinal tube 42. It is appreciated that the end portion 54 can be designed and arranged to any other configurations, such as a stop member, pin, for stopping the rotatable tube 44 from falling from the longitudinal tube 42. When the enlarged portion 62 is disposed close to the end portion 54, the rotatable tube 42 is extended to the longest working position so that the operator can stand away from the truck 68 and easily operate the crank handle 40. The phantom lines in FIG. 2 show one of the working positions whereby the enlarged portion 62 is disposed in the body portion 55 of the longitudinal tube 42.

Figure 3:
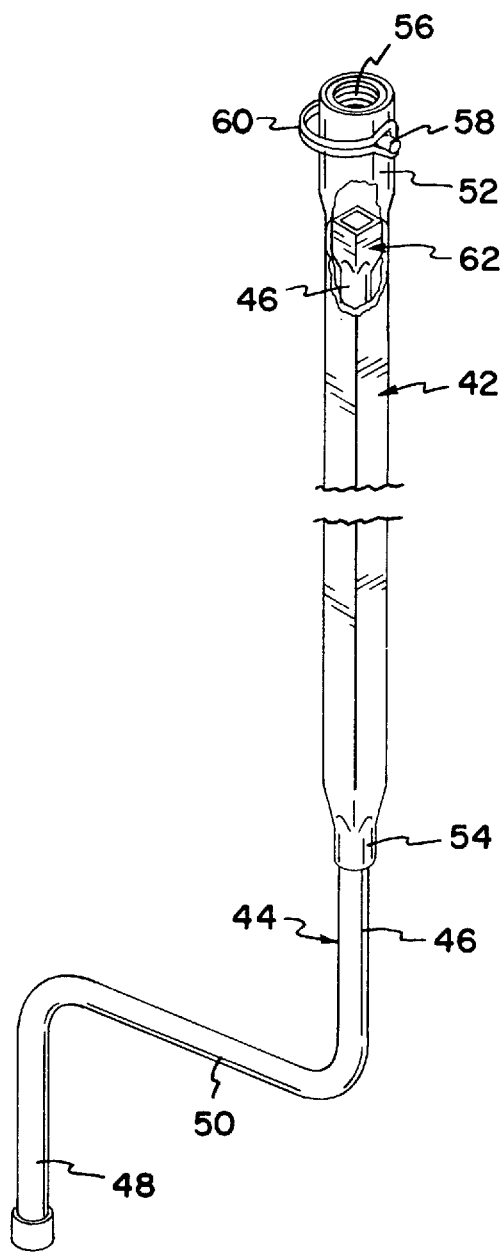
FIG 3 is a perspective view of the crank handle at the working or storing position.

FIG. 3 shows a perspective view of the enlarged portion 62 being disposed beyond the enlarged end portion 52. It is appreciated that the shapes of the enlarged portion 62 and the rest of the rotatable tube 44 can be in any other shapes as long as the rotatable tube 44 is locked at working positions and is released at the adjusting position.

Figure 4:
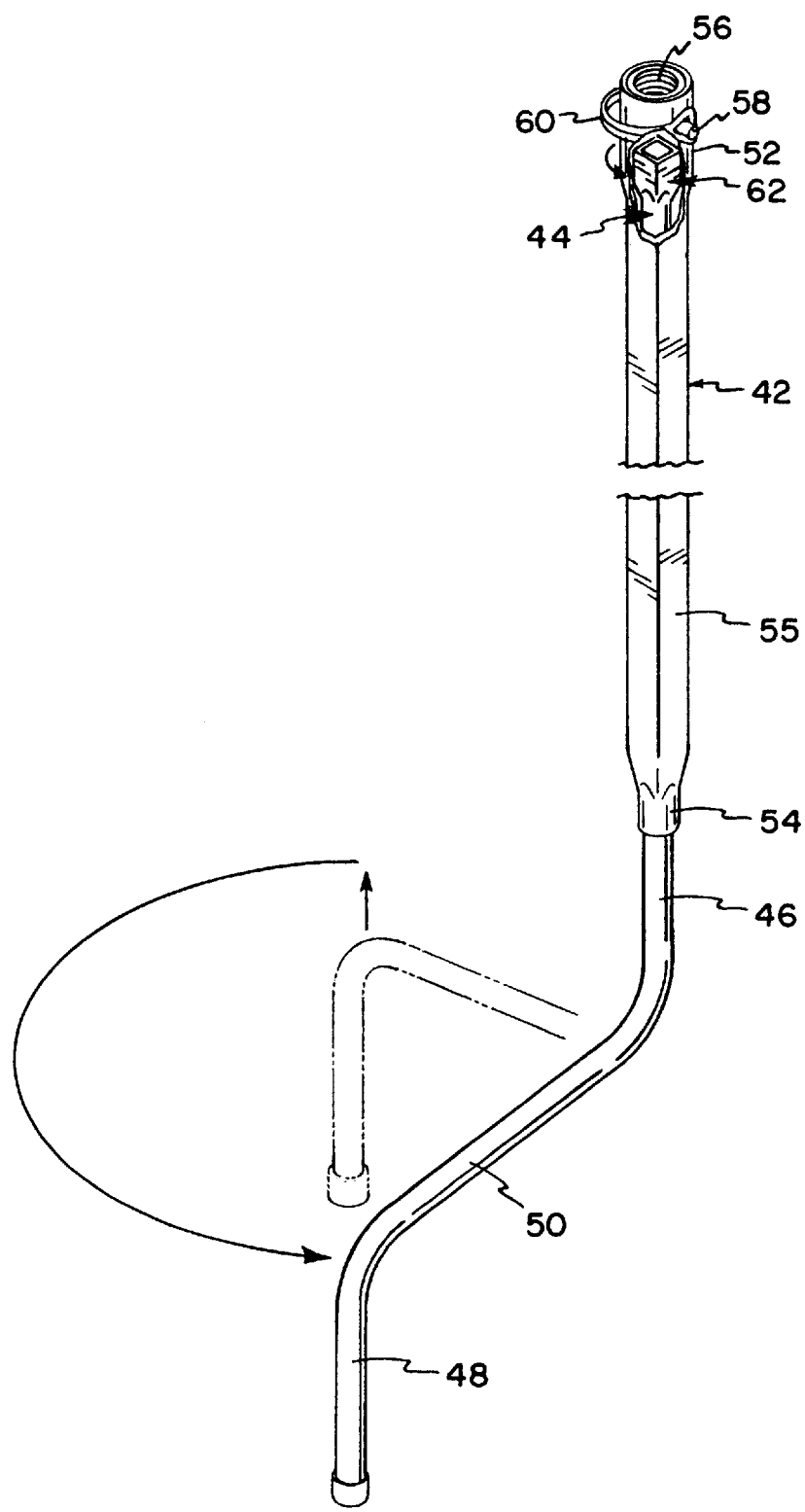
FIG 4 is a perspective view of the crank handle at the adjusting position where the crank handle is adjusted by a quarter turn.

FIG. 4 shows a perspective view of the crank handle 40 being turned from a working position. The vertical arrow shows that the rotatable tube 44 is moved upward from a working position to the adjusting position whereby the enlarged portion 62 is disposed in the enlarged end portion 52. The rotating arrow shows a rotating direction of the rotatable tube 44. Since the rotatable tube 44 and the longitudinal tube 42 are rotatably disengaged therebetween, the longitudinal tube 42 does not rotate with the rotatable tube 44. Once the rotatable tube 44 is placed at a desired position, the rotatable tube 44 is moved downward from the adjusting position to a new working position so that the enlarged portion 62 is disposed in the body portion 55 of the longitudinal tube 42. Thus, the longitudinal tube 42 is rotated with the rotatable tube 44. Since the enlarged portion 62 and the body portion 55 have rectangular cross-section, the new position is in one of the quarterly-turned positions.

Figure 5:
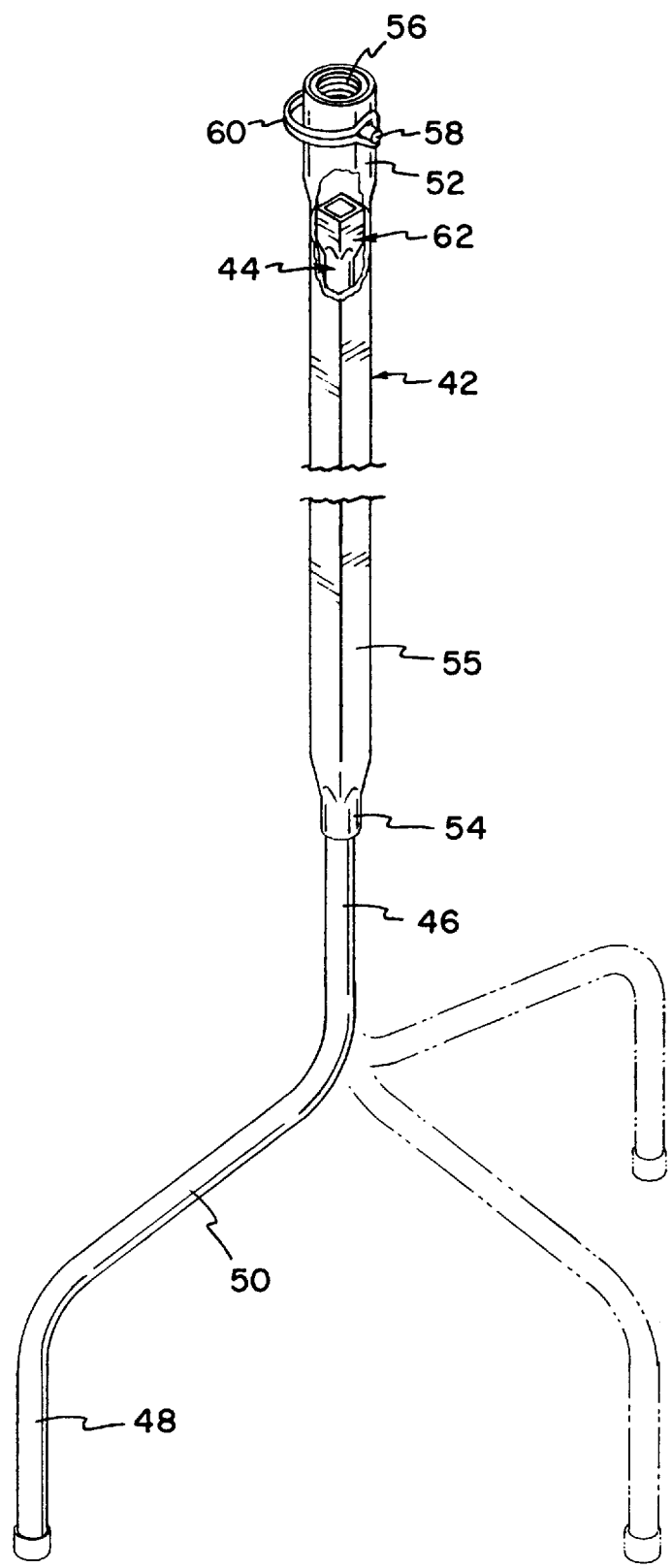
FIG. 5 is a perspective view of the crank handle at the working or storing position where the crank handle is adjustable to other quarterly-turned working or storing positions.

In FIG. 5, there is shown the rotatable tube 44 being disposed in different working positions. As mentioned above, the enlarged portion 62 and the body portion 55 have four-sided rectangular shapes, the rotatable tube 44 is rotated by 90° increments or quarter turns. It is appreciated that the enlarged portion 62 and the body portion 55 can be configured and arranged in any other multi-sided shapes so that the number of the working positions are varied accordingly.

Figure 6:
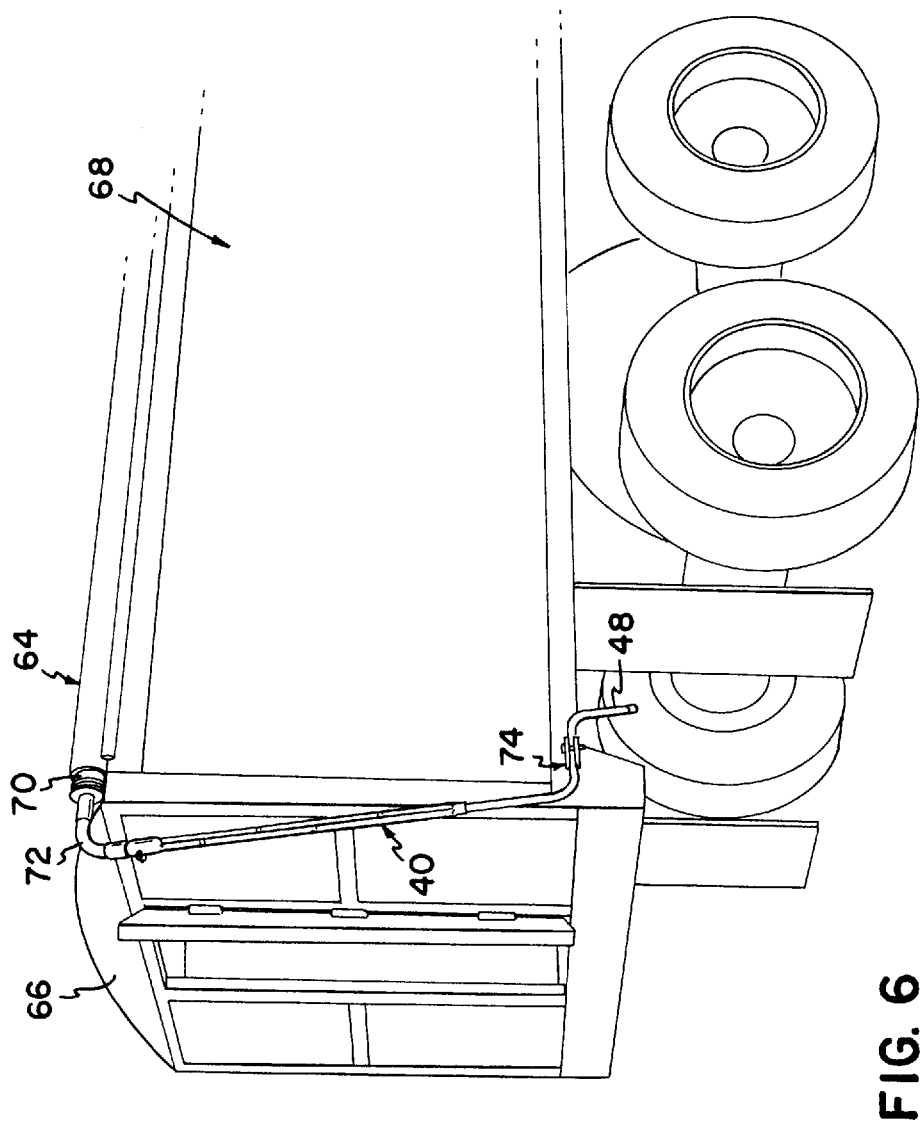
FIG. 6 is a perspective view of the crank handle being connected to a partially shown tarp assembly wherein the crank handle is stored on the side of a partially shown open truck box, which is not covered by a tarp.
Figure 7:
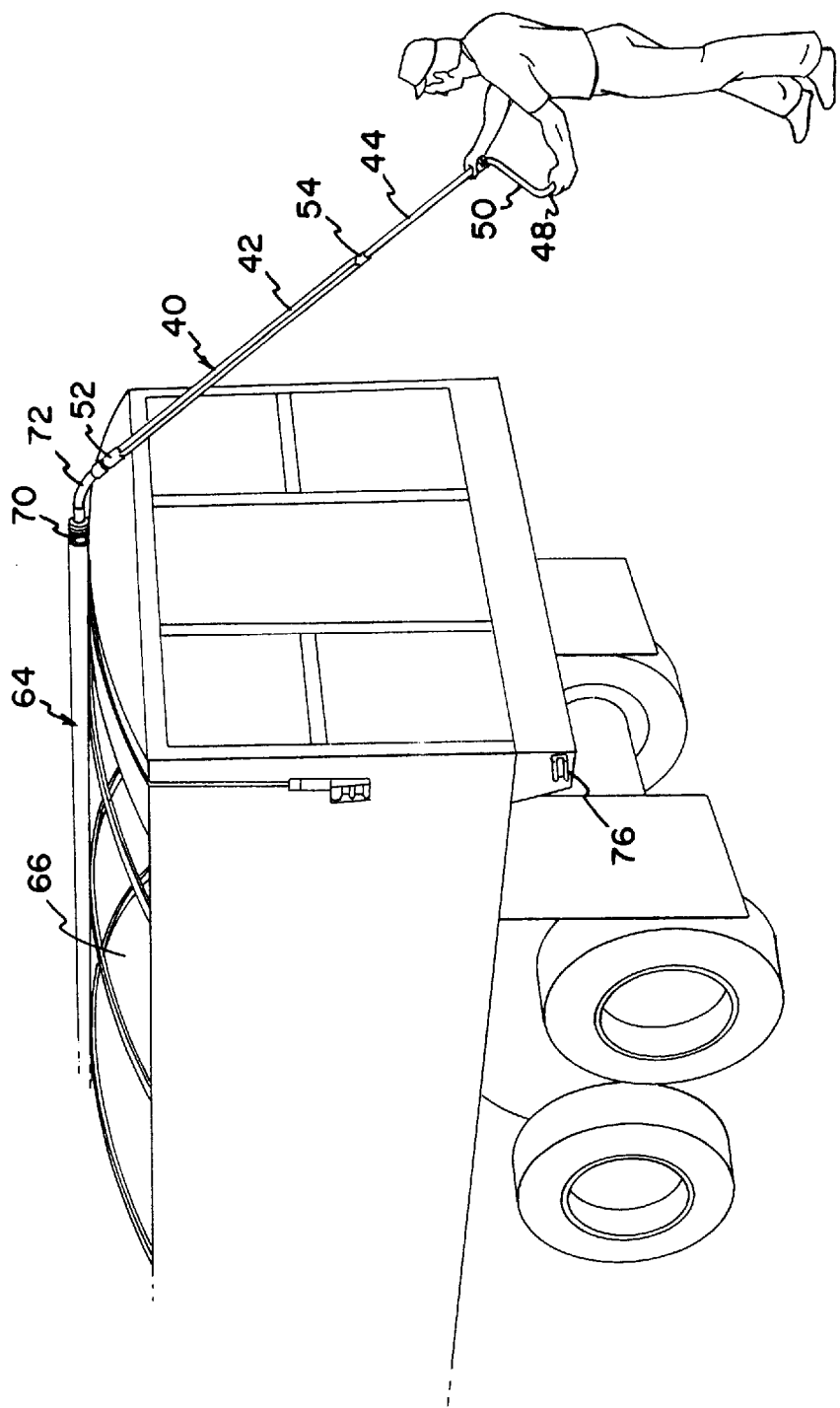
FIG. 7 is a perspective view of the crank handle being connected to the tarp assembly wherein the crank handle is extended and operated at a working position, and the open truck box is partially covered by the tarp.
Figure 8:
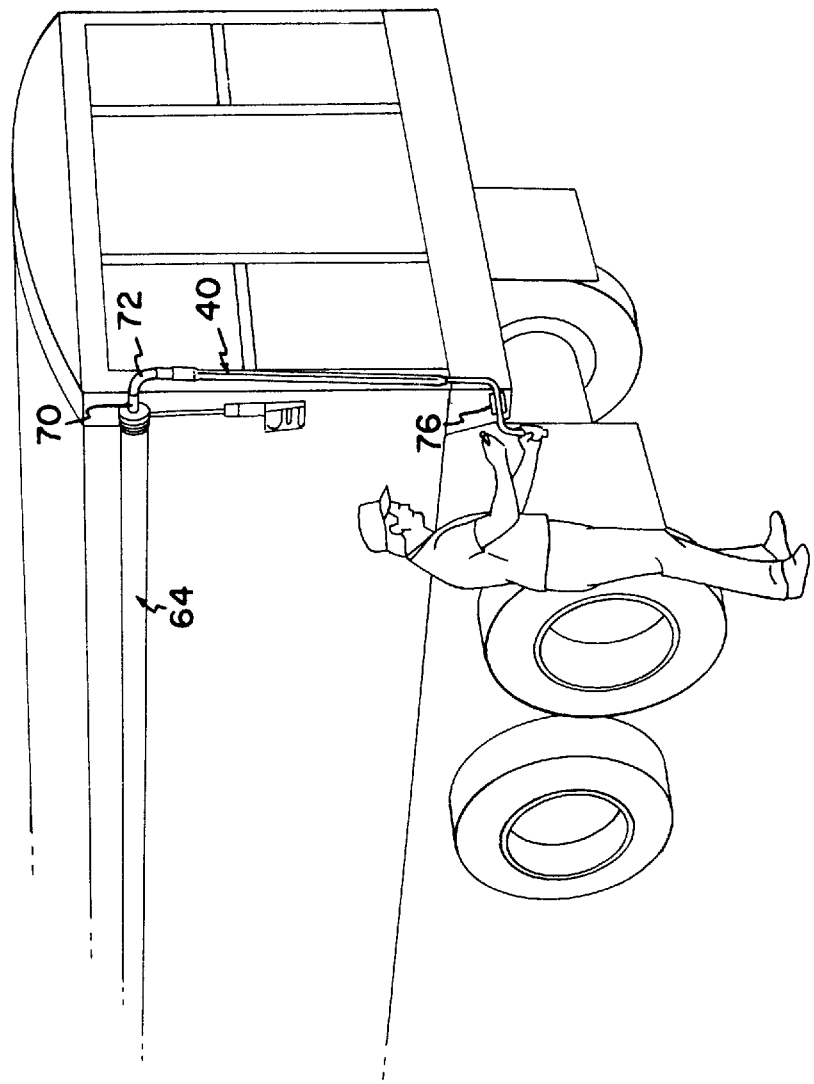
FIG. 8 is a perspective view of the crank handle being connected to the tarp assembly wherein the crank handle is retracted to the storing position and stored on the side of the open truck box, and the open truck box is fully covered by the tarp.

In FIGS. 6–8, the crank handle 40 is shown to be used in the roll-up flexible cover assembly 64 which covers or uncovers an open truck box 66 of the truck 68. The crank handle 40 is connected to the roll tube 70 through the connecting device 72. FIG. 6 shows the handle portion 48 is stored in a mounting device 74 on one side of the truck 68, and the open truck box 66 is fully uncovered. FIG. 7 shows that an operator extends the crank handle 40, stands away from the truck 68, and rolls the handle portion 48. In response to the rotating of the rotatable tube 44, the longitudinal tube 42 and the roll tube 70 rotate accordingly. The open box 66 is partially covered. FIG. 8 shows that after the open box 66 is fully covered, the operator retracts the crank handle 40, adjusts the handle portion 48 to a desired storing direction, and extends the handle portion 48 to a desired storing length. The handle portion 48 is then placed in a similar mounting device 76 on the other side of the truck 68.

It will be appreciated that alternate embodiments in keeping with the principles of the present invention might be utilized. It is to be understood, however, that even though numerous characteristics and advantages of the invention would be set, together with details of the structure and function of the invention, the disclosure is illustrative only, and changes may be made in detail, especially in matters of shape, size and arrangement of parts, within the principle of the invention, to the full extent indicated by the broad general meaning of the terms in which the appended claims are expressed.

What is claimed is:

1. A crank handle, comprising:
    a longitudinal tube having a longitudinal portion, first and second ends, and an enlarged end portion at the first end;
    a rotatable tube having a longitudinal portion and a handle portion offset from a longitudinal axis of the longitudinal portion of the rotatable tube, the longitudinal tube being telescopically disposed around the rotatable tube, so that the crank handle is extended to a desired length up to a maximum length whereby an end portion of the rotatable tube is extended from the first end of the longitudinal tube to approximately the second end of the longitudinal tube;
    wherein the rotatable tube is freely rotatable relative to the longitudinal tube when the end portion of the rotatable tube is disposed outside the longitudinal portion at the enlarged end portion of the longitudinal tube, whereby the rotatable tube is adjusted to a desired transversal position; and
    wherein the rotatable tube is locked relative to the longitudinal tube when the end portion of the rotatable tube is disposed inside the longitudinal portion of the longitudinal tube, whereby the longitudinal tube is rotated with the rotatable tube.

2. A crank handle according to claim 1, wherein the end portion of the rotatable tube is an enlarged end portion, so that when the enlarged portion of the rotatable tube is disposed in the enlarged end portion of the longitudinal tube, the rotatable tube is freely rotated with respect to the longitudinal tube.

3. A crank handle according to claim 2, wherein the longitudinal tube further includes a reduced end portion at the second end of the longitudinal tube, the reduced end portion of the longitudinal tube having a smaller diameter than the enlarged portion of the rotatable tube, so that the crank handle extends to a maximum length without having the rotatable tube fall out of the longitudinal tube.

4. A crank handle according to claim 3, wherein the the end portion of the rotatable tube and the longitudinal portion of the longitudinal tube are multi-sided, so that when the multi-sided end portion of the rotatable tube is disposed within the multi-sided longitudinal portion of the longitudinal tube, the rotatable tube is locked relative to the longitudinal tube.

5. A crank handle according to claim 4, wherein the enlarged end portion and the reduced end portion of the longitudinal tube are in a circular shape, the multi-sided end portion of the rotatable tube and the multi-sided longitudinal portion of the longitudinal tube are in a rectangular shape.

6. A crank handle according to claim 4, wherein the multi-sided end portion of the rotatable tube and the multi-sided longitudinal portion of the longitudinal tube are four-sided, so that the rotatable tube is turned by 90° with respect to the longitudinal tube.

7. A roll-up tarp assembly for a truck box or trailer having an open container, comprising:
    a roll tube;
    a tarp rolling on and off the roll tube so as to open and close the open container of the truck box or trailer;
    a crank handle being connected to the roll tube, the crank handle rotating the roll tube so as to roll the tarp; and
    the crank handle for rolling the tarp on the open container comprising:
        a longitudinal tube having a longitudinal portion, first and second ends, and an enlarged end portion at the first end;
        a rotatable tube having a longitudinal portion and a handle portion offset from a longitudinal axis of the longitudinal portion of the rotatable tube, the longitudinal tube being telescopically disposed around the rotatable tube, so that the crank handle is extended to a desired length up to a maximum length whereby an end portion of the rotatable tube is extended from the first end of the longitudinal tube to approximately the second end of the longitudinal tube;
        wherein the rotatable tube is freely rotatable relative to the longitudinal tube when the end portion of the rotatable tube is disposed outside the longitudinal portion at the enlarged end portion of the longitudinal tube, whereby the rotatable tube is adjusted to a desired transversal position; and
        wherein the rotatable tube is locked relative to the longitudinal tube when the end portion of the rotatable tube is disposed inside the longitudinal portion of the longitudinal tube, whereby the longitudinal tube is rotated with the rotatable tube.

8. A crank handle according to claim 7, wherein the end portion of the rotatable tube is an enlarged portion, the longitudinal tube includes an enlarged portion at the first end, so that when the enlarged portion of the rotatable tube is disposed in the enlarged portion of the longitudinal tube, the rotatable tube is freely rotated with respect to the longitudinal tube.

9. A crank handle according to claim 8, wherein the longitudinal tube further includes a reduced end portion at the second end of the longitudinal tube, the reduced end portion of the longitudinal tube having a smaller diameter than the enlarged portion of the rotatable tube, so that the crank handle extends to a maximum length without having the rotatable tube fall out of the longitudinal tube.

10. A crank handle according to claim 9, wherein the end portion of the rotatable tube and the longitudinal portion of the longitudinal tube are multi-sided, so that when the multi-sided end portion of the rotatable tube is disposed within the multi-sided longitudinal portion of the longitudinal tube, the rotatable tube is locked relative to the longitudinal tube.

11. A crank handle according to claim 10, wherein the enlarged end portion and the reduced end portion of the longitudinal tube are in a circular shape, the multi-sided end portion of the rotatable tube and the multi-sided longitudinal portion of the longitudinal tube are in a rectangular shape.

12. A crank handle according to claim 10, wherein the multi-sided end portion of the rotatable tube and the multi-sided longitudinal portion of the longitudinal tube are four-sided, so that the rotatable tube is turned by 90° with respect to the longitudinal tube.

13. A method of operating a crank handle of a roll-up flexible cover assembly for covering/uncovering an open container, comprising the steps of:

taking out the crank handle from a retainer;

adjusting a length of the crank handle by extending/retracting the crank handle to a certain length;

rotating the crank handle to cover/uncover the open container;

adjusting a quarter turn of the crank handle so that the crank handle is placed towards a suitable angle for storage; and putting the crank handle in the retainer.

14. A method of operating a multi-sided crank handle of a roll-up flexible cover assembly for covering/uncovering an open container, comprising the steps of:

taking out the multi-sided crank handle from a retainer;

adjusting a length of the multi-sided crank handle by extending/retracting the multi-sided crank handle to a certain length;

rotating the multi-sided crank handle to cover/uncover the open container;

rotatably adjusting an angle of the multi-sided crank handle so that the multi-sided crank handle is placed towards a suitable angle for storage; and putting the multi-sided crank handle in the retainer.

* * * * *